United States Patent [19]

Breysse et al.

[11] 3,872,145

[45] Mar. 18, 1975

[54] PROCESS FOR OBTAINING TRIMETHYLVINYLSILANE BY LIQUID-LIQUID EXTRACTION

[75] Inventors: Jacques Breysse, Villeurbanne; Gilbert Joseph Marin, Saint-Foy-les-Lyon; Marcel Lefort, Caluire, all of France

[73] Assignee: Rhone-Polenc S.A., Paris, France

[22] Filed: Nov. 21, 1973

[21] Appl. No.: 417,903

[30] Foreign Application Priority Data
Nov. 23, 1972 France.............................. 72.41637

[52] U.S. Cl. ................... 260/448.2 E, 260/448.2 Q
[51] Int. Cl. ............................................... C07f 7/20
[58] Field of Search ............... 260/448.2 E, 448.2 Q

[56] References Cited
UNITED STATES PATENTS

| | | | |
|---|---|---|---|
| 3,493,595 | 2/1970 | Strasser et al. | 260/448.2 E |
| 3,507,799 | 4/1970 | Hart | 260/448.2 E X |
| 3,607,900 | 9/1971 | Hart | 260/448.2 E |

Primary Examiner—Paul F. Shaver
Attorney, Agent, or Firm—Stevens, Davis, Miller & Mosher

[57] ABSTRACT

A trimethylvinylsilane containing less than 0.1 percent w/w tetrahydrofuran is obtained by subjecting a mixture of trimethylvinylsilane and tetrahydrofuran to liquid-liquid extraction with water. The mixtures are obtained by vinylation of trimethylchlorosilane in tetrahydrofuran and separated by counter current extraction with water.

9 Claims, No Drawings

PROCESS FOR OBTAINING TRIMETHYLVINYLSILANE BY LIQUID-LIQUID EXTRACTION

The present invention relates to a process for obtaining trimethylvinylsilane from mixtures of this compound with tetrahydrofuran.

Trimethylvinylsilane is an important organosilicon compound, since it is the starting material for the production of membranes and films made of polytrimethylvinylsilane. These membranes are permeable to gases and vapours and show very great selectivity (see French Pat. No. 2,082,095). Trimethylvinylsilane is usually prepared by vinylation, using magnesium, of trimethylchlorosilane by means of vinyl chloride in tetrahydrofuran. Liquid mixtures of trimethylvinylsilane and tetrahydrofuran, which are rich in trimethylvinylsilane, are thus obtained. The separation of the two constituents of the mixture can be achieved by rectification, but such a process is not satisfactory from the point of view of industrial profitability. Since the boiling points under atmospheric pressure of trimethylvinylsilane and of tetrahydrofuran are respectively 55° C and 66° C, it is necessary to use a very efficient distillation column and to work at a very low rate.

The present invention provides a process for obtaining a trimethylvinylsilane containing less than 0.01 percent w/w of tetrahydrofuran from a mixture of trimethylvinylsilane and tetrahydrofuran, wherein the mixture of trimethylvinylsilane and tetrahydrofuran is subjected to liquid-liquid extraction using water as the solvent.

The process according to the invention can be carried out starting from any mixture whatsoever of trimethylvinylsilane and tetrahydrofuran. Taking account of the fact that tetrahydrofurane is entrained by water, it is recommended, in order to reduce the amount of water employed, to use mixtures which contain at least 65 percent w/w of trimethylvinylsilane. Such mixtures can be obtained easily in practice. For example, they result from the distillation, using a rectification column of average efficiency, of the reaction mixture resulting from the vinylation reaction, using magnesium, of trimethylchlorosilane, this vinylation being carried out in tetrahydrofuran. This distillation column can be mounted directly on the reactor. The mixtures of trimethylvinylsilane and tetrahydrofuran can sometimes contain a small proportion of vinyl chloride and/or a small proportion of secondary constituents such as trimethylsilane, butadiene or hexamethyldisiloxane. It has been found that, when the proportion of the various impurities in the mixture was less than 10 percent w/w the separation of trimethylvinylsilane from tetrahydrofuran was achieved satisfactorily by the liquid-liquid extraction process of the invention.

The process according to the invention is carried out in such a way that an organic phase is isolated which contains trimethylvinylsilane and only small or very small amounts of tetrahydrofuran and the process according to the invention makes it possible directly to isolate trimethylvinylsilane which contains at most 0.01 percent w/w of tetrahydrofuran. The water carries the tetrahydrofuran along with it.

The process according to the invention can be carried out in any liquid-liquid extraction apparatus. These apparatuses are, for example, described in Technique of Organic Chemistry, volume III; second edition; Separation and purification; Editor: A. Weissberger. Thorpe's Dictionary of applied Chemistry, volume IV, p. 575 to 590 and "Counter-current Separation processes," p. 242 to 280 by H. R. C. Pratt and "Liquid Extraction" by R. E. Treybal ed. McGraw-Hill, p. 257 to 345.

It is possible to carry out the separation by extraction with water, working discontinuously or continuously, using single contact or multiple contact apparatuses. It is however recommended to use a continuous counter-current extraction process. The counter-current extraction column can be one containing packing material or one with perforated plates. In order to promote the dispersion of the phases, it is possible to adopt, in the column, a mechanical stirring system such as, for example, a conventional stirrer, turbine, or a propulsion device. It is also possible to use columns of the stirring-sedimenting type such as the Scheibel column. Within the scope of the present invention, it is particularly valuable to use a relatively efficient column (of the order of at least five theoretical plates), stirred by turbine.

The details which will now be given relate to a liquid-liquid extraction process carried out in a vertical column, working in counter-current. It is to be understood that these details do not limit the scope of the invention and that they are given simply in order to facilitate an understanding of the process of the invention.

The liquid-liquid extraction column is supplied with water at the top of the column and with the mixture of trimethylvinylsilane and tetrahydrofuran at the foot of the said column. Trimethylvinylsilane practically free from tetrahydrofuran is removed at the top of the column. The homogeneous mixture of water and tetrahydrofuran is recovered at the foot of the column.

The rates at which water is supplied in counter-current to the liquid-liquid extraction columns are obviously a function of the size of the column, of its efficiency, of the composition of the mixture of trimethyl vinyl silane and tetrahydrofuran and of the requirements specified as to the proportion of tetrahydrofuran in the trimethylvinylsilane issuing from the column. In practice, the optimum working conditions for the column will be determined easily by those skilled in the art by applying principles known in the field of liquid-liquid extraction. It is however necessary for a given mixture of trimethylvinylsilane and tetrahydrofuran to use the minimum amount of water, whilst ensuring that trimethylvinylsilane practically free from tetrahydrofuran is obtained. Where it is desired to limit the amount of water to the maximum extent, a very efficient column must be used. When the use of a larger amount of water is tolerated, it is possible to use a column which is relatively less effective.

By way of indication, it can be stated that, when mixtures of trimethylvinylsilane and tetrahydrofuran containing between 65 and 90 percent of trimethylvinylsilane are purified and when the water is introduced in such a way that the ratio of the flow rate of water to the flow rate of the mixture of trimethylvinylsilane and tetrahydrofuran is 3:1 to 6:1, the extraction column must comprise five to 10 theoretical plates in order to obtain trimethylvinylsilane which does not contain more than 0.01 percent of tetrahydrofuran at the top of the column. The trimethylvinylsilane thus purified can, however, still contain small amounts of vinyl chloride and other impurities such as butadiene, trimethylsilane and hexamethyldisiloxane. All these impurities can be removed easily by simple rectification.

The rates at which the liquid-liquid extraction columns are fed with water and mixture vary with the type and the volume of the column and in accordance with the requirements specified as to the purity of the trimethylvinylsilane. These rates are generally 1 to 15 m$^3$/hour/m$^2$.

The trimethylvinylsilane resulting from the liquid-liquid extraction process of the invention can be used directly thereafter for the preparation of polyvinyltrimethylsilane of high molecular weight.

The example which follows illustrates the invention.

EXAMPLE

A liquid-liquid extraction column is used, the characteristics of which are as follows:

diameter $\phi$ : 95 mm
height : 1,200 mm
12 stainless-steel plates with an overflow channel.
These plates are spaced apart evenly throughout the column:
11 stirred zones, of unit height 88 mm.

Stirring is achieved in each stage using vanes mounted on a central shaft rotating in the axis of symmetry of the column.

A mixture of the following compositions:
trimethylvinylsilane : 81.3% w/w
tetrahydrofuran : 12.9% w/w
vinyl chloride : 5.8% w/w
is introduced into the bottom of the column at the rate of 1.4 l/hour.

Water is introduced at the top of the column at the rate of 6 l/hour whilst the rate at which the stirrer rotates is set at 400 revolutions/minute. It is found that the trimethylvinylsilane which issues at the top of the column contains less than 0.01 percent of tetrahydrofuran. Water containing tetrahydrofuran issues at the foot of the extraction column via a suitable tube.

We claim:

1. A process for obtaining a trimethylvinylsilane containing less than 0.01 percent w/w of tetrahydrofuran from a mixture of trimethylvinylsilane and tetrahydrofuran, wherein the mixture of trimethylvinylsilane and tetrahydrofuran is subjected to liquid-liquid extraction using water as the solvent.

2. A process according to claim 1 wherein the mixture of trimethylvinylsilane and tetrahydrofuran is obtained by distilling the reaction mixture obtained by vinylation of trimethylchlorosilane using magnesium, this vinylation being carried out in tetrahydrofurane using vinyl chloride and magnesium.

3. A process according to claim 1 wherein the mixture of trimethylvinylsilane and tetrahydrofuran contains at least one impurity which is vinyl chloride, trimethylsilane butadiene or hexamethyldisiloxane, the proportion of total impurity being less than 10 percent w/w.

4. A process according to claim 1 wherein the content of trimethylvinylsilane in the mixture is greater than 65 percent w/w.

5. A process according to claim 1 wherein the liquid-liquid extraction is carried out in counter-current in a column.

6. A process according to claim 1 wherein the liquids subjected to liquid-liquid extraction are stirred.

7. A process according to claim 1 wherein the liquid-liquid extraction is carried out in a column comprising at least five theoretical plates.

8. A process according to claim 7 wherein the ratio of the flow rate of the water to the flow rate of the mixture is 3:1 to 6:1 and the column comprises 5–10 theoretical plates.

9. A process according to claim 5 wherein the water and the mixture are introduced into the column at a rate of 1–15 m$^3$/hour/m$^2$.

* * * * *

UNITED STATES PATENT OFFICE
CERTIFICATE OF CORRECTION

Patent No. 3,872,145          Dated March 18, 1975

Inventor(s) JACQUES BREYSSE et al

It is certified that error appears in the above-identified patent and that said Letters Patent are hereby corrected as shown below:

On page 1 of the patent, at [73], the name of the assignee incorrectly appears as "Rhone-Polenc S.A.", and should be --Rhone-Poulenc S.A."

Signed and sealed this 15th day of July 1975.

(SEAL)
Attest:

RUTH C. MASON
Attesting Officer

C. MARSHALL DANN
Commissioner of Patents
and Trademarks